United States Patent [19]

Schiffner

[11] 4,443,698

[45] Apr. 17, 1984

[54] SENSING DEVICE HAVING A MULTICORE OPTICAL FIBER AS A SENSING ELEMENT

[75] Inventor: Gerhard Schiffner, Munich, Fed. Rep. of Germany

[73] Assignee: Siemens Aktiengesellschaft, Berlin and Munich, Fed. Rep. of Germany

[21] Appl. No.: 252,081

[22] Filed: Apr. 8, 1981

[30] Foreign Application Priority Data

Apr. 25, 1980 [DE] Fed. Rep. of Germany ....... 3016104

[51] Int. Cl.$^3$ ............................................. G02B 5/14
[52] U.S. Cl. .................................. 250/227; 350/96.33
[58] Field of Search .................. 250/226, 231 R, 216, 250/227; 350/96.1, 96.33, 96.15, 96.29

[56] References Cited

U.S. PATENT DOCUMENTS

| | | | |
|---|---|---|---|
| 4,217,488 | 8/1980 | Hubbard | 350/96.33 |
| 4,298,794 | 11/1981 | Snitzer | 250/227 |
| 4,363,533 | 12/1982 | Stowe et al. | 350/96.33 |

*Primary Examiner*—David C. Nelms
*Attorney, Agent, or Firm*—Hill, Van Santen, Steadman & Simpson

[57] ABSTRACT

A sensing device which includes a sensing element in the form of an optical fiber, a device for coupling light into the fiber and a device for measuring changes in the specific physical parameters of the light passing through the fiber to determine special physical influences applied to the fiber characterized by the fiber being a multicore fiber having at least two adjacently extending cores surrounded by a common cladding and the means for measuring the changes in the parameter of the light measuring the alterations in the light passing through each of the cores. To make the device sensitive to bending and deformation in all directions, the fiber may have two cores and be twisted through 90° or the fiber may have three or more cores which are not disposed in the same plane. The measuring of the amount of change may be by measuring the interference pattern from superimposed beams of the output from the two cores or by measuring the intensity of each of the output beams separately.

17 Claims, 11 Drawing Figures

U.S. Patent  Apr. 17, 1984  Sheet 1 of 4  4,443,698
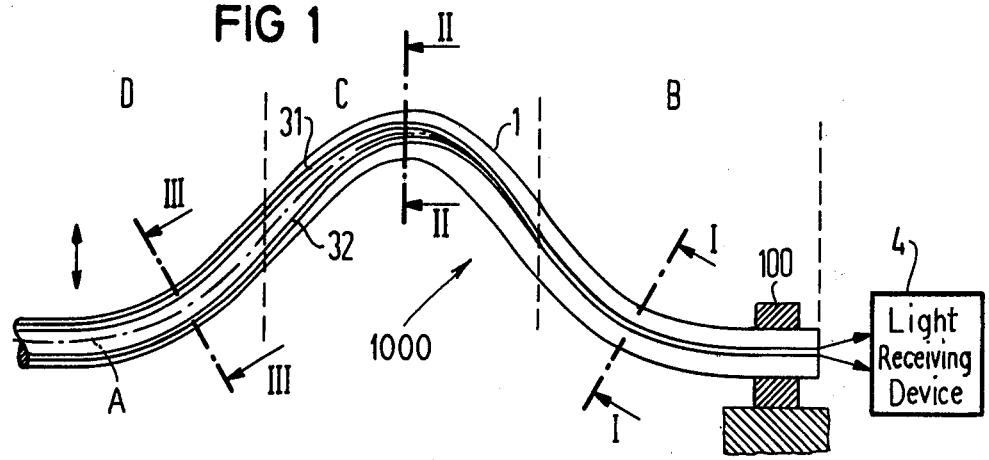
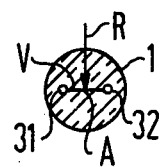 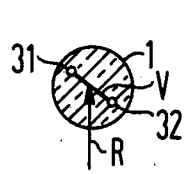 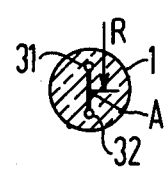 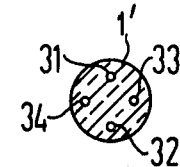
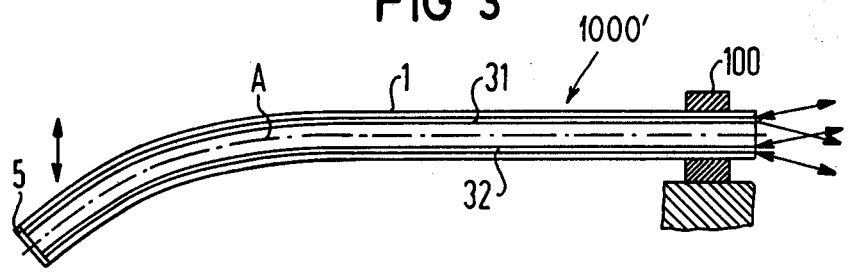
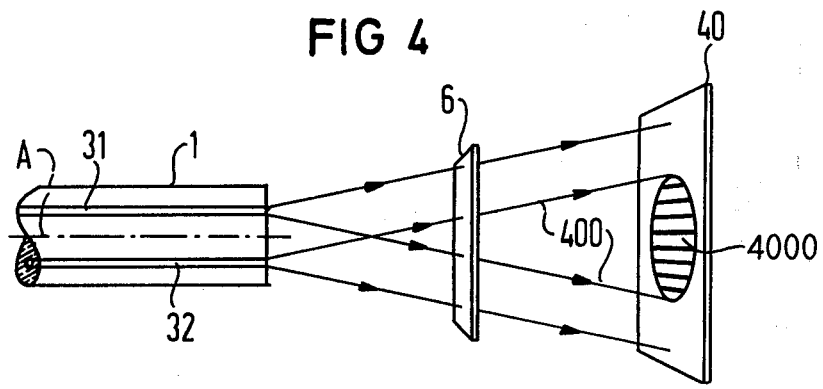

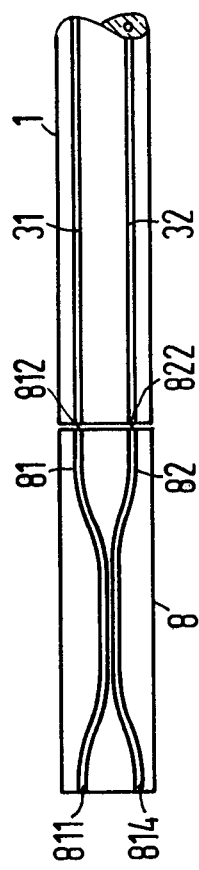
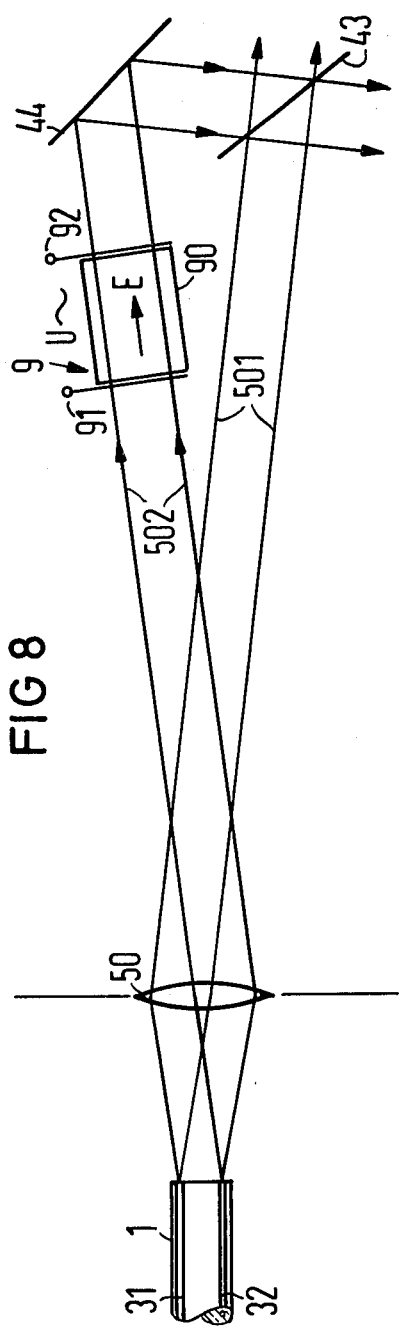

SENSING DEVICE HAVING A MULTICORE OPTICAL FIBER AS A SENSING ELEMENT

BACKGROUND OF THE INVENTION

The present invention is directed to a sensing device comprising a sensing element such as an optical fiber with a means or device for measuring the alterations or changes in specific physical parameters of a light which has been coupled into the fiber and passed therethrough to determine specific physical influences applied to the fiber.

A sensing device of the type which measures a physical influence by determining alterations or changes in a specific physical parameters of a light passing through an optical fiber are known. An example of such a sensing device is a ring interfermeter, which is employed for example for the purpose of sensing rotational speeds. In the case of ring interferometers of this type, light is coupled into both ends of the fiber. The light, which passes through the fiber in one direction, and the light which passes through the fiber in the opposite direction are then brought into interference through superimposition and in this state are measured by an intensity meter. Thus, the intensity of the light, which is passed through the fiber, is measured as a physical parameter. The physical effect on the fiber is the rotational movement of the fiber and the measured intensity will vary with the angular velocity of this rotational movement. The dependency of the intensity upon the angular velocity is based on the Sagnac effect.

Other physical effects or influences on a fiber can alter specific parameters of the light which is passed through the fibers. Examples are pressure, tension, and also temperature influences on the fiber, which can for example, alter the traversal speed of the light through the fiber or also its polarization state as a physical parameter. A sensing device which has an optical fiber as the sensing element, and includes means for coupling light into the fiber and means for measuring alterations in specific physical parameters of the light passing through the fiber to determine special physical influences applied to the fiber have already been proposed and described in my copending U.S. application Ser. No. 179,665, filed Aug. 19, 1980, which application was based on German patent application No. P 29 36 303.9. This device would react to either temperature, tension or temperature variations. In particular, a sensing device of this type can be employed as an accoustical sensor.

As a specific parameter, parameters or indications of the traversed light are to be understood which are actually measured by a measuring device. A parameter of this type need not be a direct parameter but on the contrary it can also be dependent parameter. In the case of the above indicated example of a ring interferometer, the direct parameter would be the transit time of the light which is passed through the fiber. In the case of a rotating fiber, the Sagnac effect, namely does not bring about reciprocal transit time differences between light which passes through the fiber in both directions. This transit time difference in turn brings about indirect intensity changes in the interference light. In this sense the intensity is a dependent parameter.

SUMMARY OF THE INVENTION

The present invention is directed to providing a sensor device which will sense special physical influences applied thereto, which sensing device will react particularly sensitively to bending or deforming of a fiber.

To achieve these objects, the present invention is directed to an improvement in a sensing device having a sensing element including an optical fiber, means for coupling light into the fiber and means for measuring alterations or changes in specific physical parameters of the light passing through the fiber to determine special physical influences applied to the fiber. The improvement comprises the fiber being a multicore fiber having at least two adjacently extending cores surrounded by a common cladding and said means for measuring the alterations in the parameter of the light measuring the changes in the light passing through each of the cores.

An increased bending sensitivity of the proposed sensing device is based on the fact that in case of a bending or deformation of the multicore fiber as a rule, different physical effects or influences are applied on the various cores which will influence the parameter of the light which is passing through each of the cores differently. In the case of only two parallel cores, the bending sensitivity is strongly dependent on how the fiber is bent. This deficiency can be remedied by measures which include twisting the fiber about its longitudinal axis so that the two cores have a helical configuration. Another solution is by providing a multicore fiber having at least three cores which are not colinearly arranged in the cross-section, do not lie in the same plane and preferably are symmetrically arranged around the axis of the fiber and the means for measuring the alteration measures the specific physical alterations or changes of the parameters for at least two pairs of cores with the cores of the two pairs in cross-section not being colinear or parallel to each other. In addition, the fiber having three or more cores can also be twisted as with the arrangement with the two core fiber.

In a particular advantageous embodiment of the sensing device, the multicore fiber is so designed that one end is provided with a mirror. Thus, the sensing device has the light coupled into and out of the same end. By such an arrangement, the transit time of the light in the core is either doubled or the fiber length can be cut in half for the same amount of transit time.

It is advantageous that the multicore fiber, which is utilized has each core with a diameter that is so small that the core essentially can only conduct one mode. In addition, to eliminate interferring cladding modes, it is desirable to provided the multicore fiber with a mode stripper or means for stripping cladding modes therefrom.

An advantageous embodiment of the sensing device has the adjacently running cores spaced apart a sufficient amount so that no appreciable cross-coupling will occur. The means for measurement will include light receiving surface which are arranged in the path of light which passses through the two cores and has been brought into interference by means of superimposition. This embodiment is an interferometer and advantageously all experience and knowledge of interferometers particularly in the case of ring interferometers can be taken advantage of by this embodiment. In particular, the sensing means may use a light receiving surface which is a collecting screen in which the interference pattern can be directly observed or the light receiving surface may be the light sensitive surface of a light sensitive detector which will monitor the light intensity of the interference pattern. To superimpose the light beams emitted from each of the cores, a beam divider device or devices may be utilized.

Another advantageous embodiment of the proposed sensing device is to utilize a multicore fiber having two adjacently extending cores which have such a smaller interval therebetween that an appreciable amount of cross coupling of light will occur between the cores. The light which is being coupled out of each of the cores is then supplied separately to a separate light receiving surface. In this embodiment, the cross coupling takes place already between the closely adjacent cores which is strongly dependent upon the bending of the multicore fiber. The intensity of the light coupled out of the cores is measured separately for each core. The ratio for each of the two separately measured intensities is a measurement of a degree of bending of the fiber. To measure the intensity, each light receiving surface is preferable a light sensitive surface of a light sensitive detector so that the device includes a light sensitive detector for each beam.

Since the light emerging from each of the cores is divergent, it is desirable or even necessary in each of the above embodiments particularly those which use light sensitive detectors to concentrate the divergent light into a beam of parallel rays or beams which can be expediently achieved by use of various light collecting optics and lenses.

It is also advantageous to design the proposed sensing devices with a polarizer being arranged in the path of the rays coming from each of the cores. In this case, the interferring polarization effect can be eliminated; however, the polarization effects can also be utilized by the device as one of the changing parameters.

For coupling light into the multicore fiber of the present invention, several different arrangements may be utilized. For example, a beam divider may be placed in the path of the light emitted by a light source, such as a laser, to split the light into two separate beams which are then separately directed into each of the two cores of the multicore fiber. If the device has the fiber provided with a mirror on the opposite end from the end in which the light is being coupled, then the same end has both the input and output coupling of light. In this case, the means for coupling light in must be so designed to enable the desired measurements to be conducted on the light that is emitted from the cores and not interfere with the measurements of the parameters of the light passing through the core. With the means for coupling light into the cores utilizing a beam divider mirror, the light from the source may be coupled into one of the beam divider mirrors that are used for superimposing the beams being emitted from the cores. It is also possible, that the beam divider comprises an optical directional coupler comprising a pair of cores closely spaced together so that the cross-coupling will occur therebetween and has at least two output gates for coupling light into the cores of the fibers and at least one input gate for coupling light into the coupler.

It should be noted that the above embodiments are preferably used with a multicore fiber which has the cores spaced far enough part so that there is no crossover of the light between the cores. If the multicore fiber has two cores which are closely adjacent to each other to allow cross-over, then the means for input coupling includes a lens system for focusing the light from the source onto each of the cores at the one endface.

In another embodiment of the sensing device, it is desirable that the light which is being coupled out of the two cores is at least conducted at mutually separate paths for part of the distance and a controllable optical phase modulator is arranged in one of the separate paths. This enables the provision of a periodic fluctuating phase shift in one of the beams of light being coupled out of the core. From this measurement, the occurring phase shift between the light which has been coupled out from various cores can be compensated and utilized in a measurement technical fashion. In the case of impressing a fluctuating phase shift, information can be additionally obtained regarding the direction of the bending of the multicore fiber.

The proposed sensing device responds not only to the bending of the multicore fiber, but also to other deformations, for example, compression. The proposed sensing device can be employed for the construction of a great variety of sensors, for example, as a sensor for displacement or angular changes in conjunction with a bimetal strip as a temperature sensor or also as a microphone.

BRIEF DESCRIPTION OF THE DRAWINGS

FIG. 1 is a partial view of a sensing device in accordance with the present invention;

FIG. 2a is a cross-sectional view taken along the lines I—I of FIG. 1;

FIG. 2b is a cross-sectional view taken along the lines II—II of FIG. 1;

FIG. 2c is a cross-sectional view taken along the lines III—III of FIG. 1;

FIG. 2d illustrates a cross-section of a multicore fiber comprising four cores in accordance with the present invention;

FIG. 3 is a side view of a multicore fiber which is clamped at one end and provided with a mirror at the opposite end in accordance with the present invention;

FIG. 4 is a partial view of an end of a sensing device in accordance with the present invention having a fiber with two cores illustrating one embodiment for detecting light emitted from the cores;

FIG. 7 is a side view on an optical directional coupler and an end of the sensing device of the present invention; and FIG. 8 is a partial schematic view with an optical phase modulator in the path of a beam from one of the cores.

DESCRIPTION OF THE PREFERRED EMBODIMENTS

Figure 5:
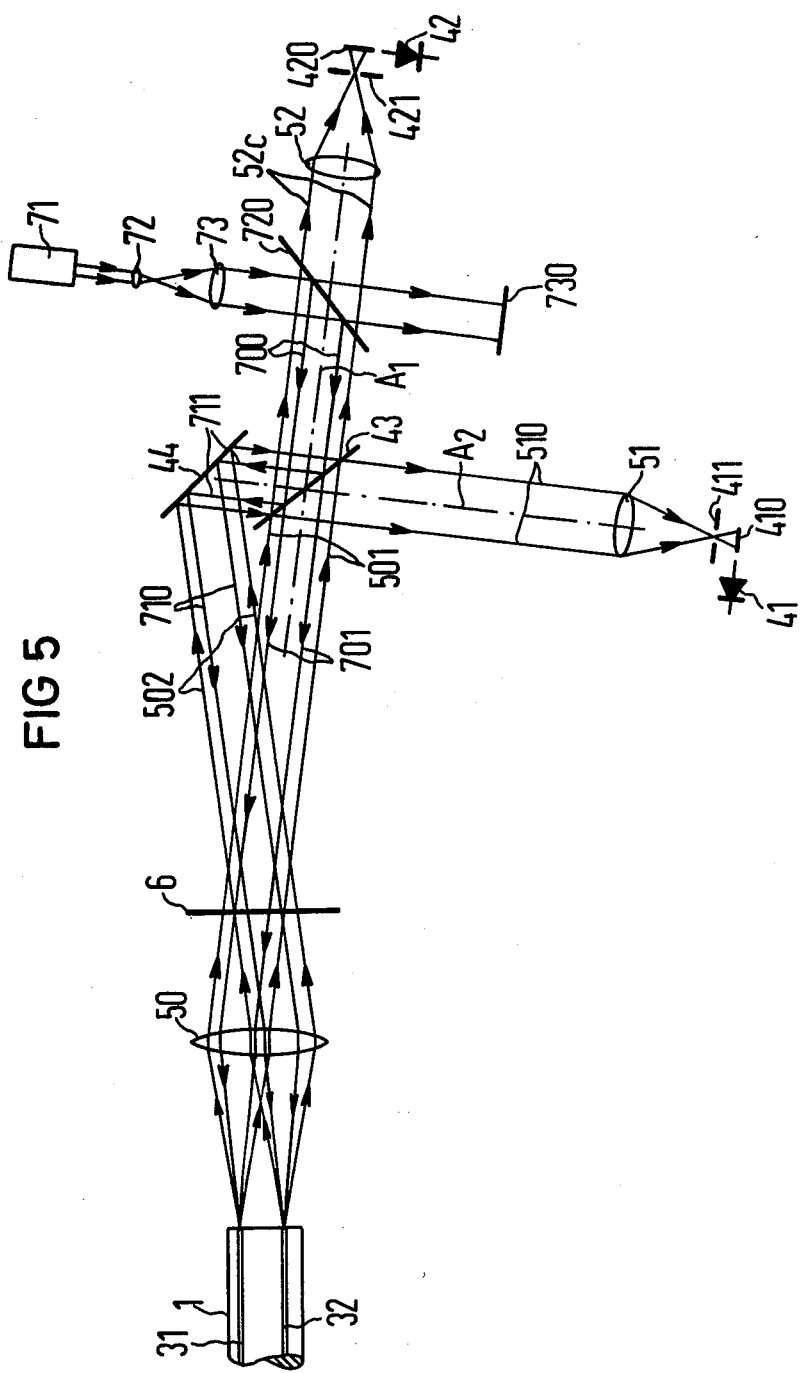
FIG. 5 is a schematic illustration of one end of a sensing device illustrating an embodiment for measuring the interference intensity of the light from each of the cores and an embodiment for coupling light into the end face in accordance with the present invention.

The principles of the present invention are particularly useful in a sensing device generally indicated at 1000 and having one end illustrated in FIG. 1. The device 1000 utilizes an optical fiber 1, which is a multicore fiber that has a pair of adjacent parallel extending cores 31 and 32, which are surrounded by a common cladding. As illustrated, one end of the fiber 1 is held in a clamp 100 adjacent a light receiving device 4 which acts as means for measuring the changes or alterations in specific physical parameters of the light which is passing through the cores 31 and 32 and emitted through the end adjacent the clamp 100. It should be noted that each of the FIGURES is not drawn to scale and the thickness and size of the multicore fibers are illustrated in a greatly exaggerated form.

The bending sensitivity of the proposed sensing device 1000 is based on the fact that in the case of bending a multiple core fiber, optical properties of the two cores such as 31 and 32 can change relative to one another and hence also specific parameters of the light which is traveling in the two cores will have changes. Such relative changes in the properties of the two cores can also be caused by means of other mechanical influences on the fiber. For example, the changes can be created by means of a compression.

For example, in the case of bending, the optical path lengths and refractive indices of the cores and hence also the transit time of light through the two cores can change relative to one another. The transit time differences can be measured as a physical parameter of the light which has passed through the cores and the transit time differences are a measure of the bending or the other type of deformation of the fiber.

The greatest transit time differences are obtained in a curvature when the shortest connection V between two cores 31 and 32 runs in a direction of the radius of curvature R. This condition is illustrated in FIG. 2c in which the axis A of the fiber also extends between the two cores. Thus, the outermost fiber in the direction of the radius of the bend is placed in tension while the radially inner core will be placed in compression. The fact that one fiber is placed in compression and one is placed in tension will create great transit time differences in the light traveling in the two cores.

If by contrast, the shortest connection V extends perpendicular to the radius of the curvature R as illustrated in FIG. 2a, then each fiber is subjected to the same amount and type of deformation and no transit time differences will occur between the light traveling in the two cores.

It is expedient to twist the multicore fiber 1 along the axis A through for example 90°. The fiber is thus subdivided into two or more longitudinal regions which are distinguished from one another in that they are variably sensitive with respect to the same direction of bending of the fiber. In the case of the multicore fiber 1 in FIG. 1, a twisting of the fiber is assumed. In the terminal section B, which is adjacent the clamp 100, the shortest connection V is extending perpendicular to the plane of the drawing. In the following section C, the fiber is rotated or twisted and the shortest connection V rotates in this region gradually from a vertical position into a position which is parallel to the plane of the drawing which is the position that is obtained at the boundary to the section D, which follows section C. In section D, the fiber is optimally sensitive to bending in a direction parallel to the plane of the drawing while the fiber section B does not react to such a bending at all. In section B, the fiber will react optimally to bending in a direction perpendicular to the plane of the drawing, whereas the fiber in section D will not react to such bending at all. In the section C, the fiber is optimally sensitive to bending in the various directions extending obliquely to the plane of the drawing.

If a multicore fiber 1' has three or more cores which are not colinearly arranged in the cross-section and do not lie in the same plane, (see FIG. 2d), the fiber 1 can also be made optimally sensitive for various bending directions. The multicore fiber illustrated in FIG. 2d has four cores 31, 32, 33, and 34, which are arranged on the corners of a rectangle or actually a square. The four rectangle sides and the two diagonals of the rectangle are the shortest connection between two cores and represent optimum directions, i.e., the case of bending the fiber in such a direction for optimal sensitivity. The light receiving device 4 is to be designed so that it can ascertain the transit time differences between two cores of every employed pair of cores. In this case, the multicore fiber according to FIG. 2d has six pairs of cores which are the pairs 31, 33; 33, 32; 31, 32; 32, 34; 31, 34; and 33, 34. The pairs 31, 33 and 34, 32, as well as the pairs 31, 34 and 32, 33 are each equivalent because their rectangular sides extend parallel to one another respectively. A pair, whose shortest connection runs parallel to that of another pair contributes nothing to the improvement of the bending sensitivity in a different direction. An additional core, which is arranged in cross-sectional colinearly or in line with two other cores so that these cores lie in the same plane, will contribute just as little to an improvement in the bending sensitivity for any other direction.

An embodiment of the device 1000' is illustrated in FIG. 3 and a multicore fiber 1 which is provided with an end opposite the clamping device 100 with a mirror 5. The mirror 5, which may a vapor deposited metal layer, will reflect the light which is entered to the other end and passed along the cores so that it exits through that other end. Thus, the light which is coupled out of the core such as 31 and 32 has passed along the cores twice and this will mean that the transit time is twice as great as the transit time in a fiber of the same length in which the light only passes through the cores once as it is coupled into one end and coupled out the opposite end. Thus, for a given, transit time difference, a fiber having a mirror 5 provided at one end can be half as long as a fiber that has the light coupled at one end and coupled out the opposite end.

Transit time differences can be advantageously measured with an interferometer arrangement. Thus, it is expedient if the means for measuring is constructed as an interferometer arrangement. In this connection, it must be mentioned that it is also advantageous similar in a known ring interferometer if the diameter of each core in the multicore fiber is so small that the cores can conduct only one mode respectively. Interferring cladding modes can be made to disappear either by making the multicore fibers so long that the cladding modes have decayed before they reach the end of the fiber and/or by providing a mode stripper on the fiber for stripping interferring cladding modes.

There are several possibilities of constructing a means for measuring which is in the form of an interferometer arrangement. In the case of one embodiment, the multimode fiber 1 is employed in which two adjacent running cores 31 and 32 are separated so far from one another that no appreciable cross coupling between the two cores will occur. Therefore, light that passes through the cores must be brought in to interference outside the fiber. This is most expediently takes place in such a fashion that the light receiving device 4 exhibits a light receiving surface which is arranged in an optical path of the light which is passed from the two cores 31 and 32 and which has been brought into superimposition to form a superimposed beam 400 for the purposes of interference. A simple realization of such an installation is illustrated in FIG. 4. The light receiving surface here essentially consists of collecting screen 40 on which an interference pattern 4000 is directly observed. Of course, in order to improve the image quality, for example to enlarge or reduce the interference portion or image 4000, imaging objects could be employed which are to be arranged in the optical path of the light which is passed or emitted from the cores 31 and 32. The interference pattern 4000 observed on the collecting screen 40 varies when the phase velocity of the light, which is passed through one or both cores, changes relative to the phase velocity of the light which is passed through the other core. This is due to a change in the transit time difference. The position of the dark or bright structures of the interference pattern 4000 is a measure of the difference of the phase velocities in both cores.

In order that the light which is passed through the cores can interfere, light which is capable of interference must be coupled into the cores. To this end, it is best to utilize light from a source such as a laser. It is also desirable that the light to be coupled in is also polarized and preferably this is a linear polarization.

In utilizing linearly polarized light, it can happen that the multicore fiber 1 converts the light into the elliptically polarized light which as a consequence would have a poor contrast in the interference pattern 4000. Therefore in order to achieve a good contrast, it is advantageous to position a linear polarizer 6 in the optical path such as 400 of the light which is being emitted or coupled out of the cores 31 and 32. In order to obtain the maximum transmission, the direction of polarization of the linear polarizer must be adjusted relative to the direction of polarization of the light from the source which light is being coupled into the fiber, for example parallel to the direction of polarization of the light from the source. It should be noted, that the device illustrated in FIG. 3 can also have a polarizer such as 6 provided adjacent the exit end. In addition, the following described devices may also have polarizers.

Instead of the visual operation or monitoring of the interference pattern with a collecting screen such as 40, an electronic monitoring of the interference pattern can also be utilized. In such an instance, a light receiving surface consists of a light sensitive surface of a light sensitive detector which monitors the light intensity of the interference pattern and preferably the integral intensity of the pattern. An embodiment of the receiving device or the means for measuring is illustrated in FIG. 5. In such an arrangement, two detectors 41 and 42 are provided with the detector 41 having a light receiving surface 410 and the light detector 42 having a receiving surface 420. The device has a fiber 1 with two cores 31 and 32 with the core 31 emitting a light in a beam path 501 and the core 32 emitting light in a path 502. The device will include a pair of beam dividing devices 43 and 44 which are positioned in the two respective paths 501 and 502 so that the portion of the light in each of the paths is superimposed into a superimposed beam 510 which is directed at the light receiving surface 410 and another portion is superimposed into a path 52c which is directed at the light receiving surface 420.

The beam divider device 43 is a semi-transmissive mirror and is arranged in the ray or beam path 501 which originates from the core 31. The mirror 43 is inclined at an angle of 45° to the axis $A_1$ of the path 501 and reflects a portion of the beam 501 along an axis $A_2$. The other beam divider 44 is a nontransmissive or opaque mirror, which is positioned adjacent the semi-transmissive mirror 43 and arranged in the path 502 of the light originating from the core 32. The mirror 44 is inclined to the axis of the path 502 so that it reflects the beam of the path 502 to extend along an axis $A_2$ and at the mirror 43. A portion of the reflected beam passes through the mirror 43 and is superimposed with a portion of the path 501 reflected by the mirror 43 to form a superimposed beam 510 which is supplied to the light receiving surface 410 in a concentrated fashion. A portion of the beam 502, which is reflected by the mirror 44 along the axis $A_2$ is reflected by the semi-transmissive mirror 43 along the axis $A_1$. This portion, which reflected along the axis $A_1$, will be superimposed with a portion of the beam 501, which passed through the mirror 43 to form a superimposed beam 52c which is directed to a light receiving surface 420 of the detector 42.

The light emitted by the cores 31 and 32 is formed of respectively divergent rays. It is expedient to concentrate these divergent rays by use of a collecting optics such as a lens system so that a divergent light is converted into a beam of parallel rays. In such an arrangement, the lens 50 acts to convert the divergent rays into beams of parallel extending rays. After passage through the various beam dividers such as 43 and 44, the parallel beams are then focused into converging beams by lenses 51 or 52 respectively, with the lens 51 being disposed in the path of the beam 510 and the lens 52 in the path of the beams 50c. The utilization of parallel focused bundles of rays in the regions of the mirror devices is desirable, because in this instance, the interval between the mirror will have no influence on the position of the real image of the end face of the cores 31 and 32. The utilization of the converging ray paths in the region between the lenses 50 and lenses 51 or 52, respectively, will cause the real image of the core end faces to disintegrate as the distance from the axis increases.

It is also desirable to use diaphragms such as 411 and 421 adjacent the focal point of the light being concentrated by the lenses 51 and 52 respectively. Thus, a diaphragm such as 421 is at the focal point for the lens 51 and keeps unwanted light from the surface 420 of the detector 42. In a similar mannner, the diaphragm 411 is at the focal point for the lens 51 to remove undesirable light and prevent it from hitting the sensing surface 410 for the detector 41.

In another embodiment of the interferometer, a multicore fiber 1" is utilized in which the two adjacently extending cores 31 and 32 exhibit such a small interval therebetween and that an appreciable amount of cross coupling will occur therebetween. As a consequence of bending or deformation of the fiber, the phase velocity in the two cores of this fiber will change relative to one another, this will effect, among other things, a change in the cross coupling. In addition, as in the above described first embodiment, the phase position of the two light waves emerging from the cores will change. If the intensity of these two light waves are measured, the ratio of these intensities is a measurement of the relative phase velocity in the core and hence of the transit time difference. Accordingly, the light coupled out of the core 31 and the light coupled out of the core 32 are supplied separately from one another to a light sensitive surface.

For an electronic evaluation or analysis, it is again expedient if the light coupled out of one core is applied to the light sensitive surface of a light sensitive detector and the light coupled out of the other core is supplied to a different light sensitive surface of another light sensitive detector.

Figure 6:
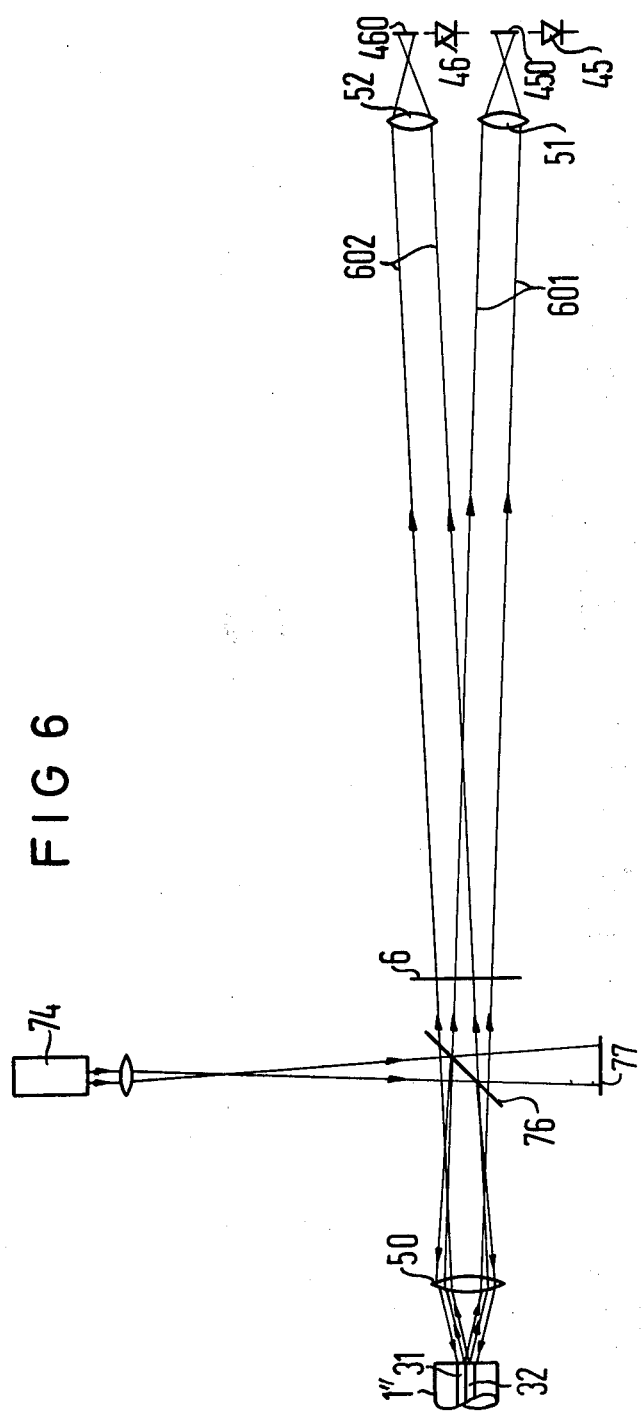
FIG. 6 is a schematic illustration of one end of a sensing device in accordance with the present invention illustrating the embodiment of means for measuring the light separately emitted from each of the cores.

In FIG. 6, a sample embodiment of the corresponding receiving device is illustrated. Light which has been coupled out of the core 31 is supplied as a ray path 601 to a light receiving surface 450 for a detector 45. The light which is being coupled out of the other core 32 is separately applied as a ray path 602 to a light receiving surface 460 of a second detector 46. Here also, the light emerges divergently from the cores and is concentrated by means of a collecting optics 50, 51 and/or 52. The lens 50 first converts the two divergent light beams which emerge from each of the cores into separate parallel beams and the second lenses such as 51 will concentrate the parallel beam 601 onto the surface 450 while the lens 52 concentrates the beam 602 onto the surface 460. The lens 50 could also be constructed so that it also produces convergent rays which are concentrated on the light receiving surfaces 450 or 460, respectively, and thus, the lenses 51 and 52 could be eliminated. Here also, unwanted light can be reduced by the use of diaphragms which are not illustrated. The electronic analysis can proceed so that the quotient formation unit is connected to the two detectors 45 and 46 and forms a ratio of the detector signals.

The cores of the multicore fiber can also be so close to one another that they contact one another or they can even be partially fused together with one another. In the above described embodiment, the optimum sensitivity can be obtained through a suitable selected fiber length.

It is pointed out that in the case of the just described embodiment, light coupled out of the core 31 and light coupled out of the adjacent other core 32 do not necessarily need to be supplied separately to separate light receiving surfaces. Thus, they can be superimposed in the manner proposed in the embodiment illustrated in FIG. 5. Preferably, however, the light beams are separately supplied to separate light receiving surfaces.

In order to couple light into the two cores of the light waveguides such such as 1 or 1", a coupling-in device can be employed which comprises a light source and a beam divider optic which splits up the path of rays coming from the light source into two partial paths of rays and then concentrates these two partial rays to focus them onto the two cores.

A preferred embodiment of a coupling-in device of this type is schematically illustrated in the embodiment of FIG. 5. As a light source, the laser 71 is provided and the laser 71 will emit a beam of linearly polarized light which is expanded by a beam expansion optics comprises lenses 72 and 73. The beam divider optics comprise the beam divider mirror 43 which is arranged parallel to a beam path 700 of the expanded light from the source 71. The beam divider 43 is arranged obliquely to the axis $A_1$ which is also the axis of the beam path 700 so that a portion 711 is reflected by the beam divider mirror 43 towards the mirror 44 which in turn reflects it as a beam 710 that is focused by the lens 50 for coupling into the core 32. Another portion of the beam 700 passes through the partially transmissive mirror 43 along a beam path 701 which extends on the axis $A_1$ and is focused by the lens 50 into the core 31. As can be seen, this coupling-in device is combined with the corresponding beam dividers utilized in the means for measuring the changes in the parameters of the light coupled out of the cores in such a fashion that the mirror devices and the lenses of the means for measuring and the beam divider optics of the coupling-in means coincides. This combination possibility is of a particular advantage because in this fashion, the in coupling and the out-coupling is rendered possible into a fiber with a mirror at the opposite end. However, if both superimposed beam paths 701 and 710 emitted by the common beam divider mirror 43 are employed for the measurement such as in the case of the FIG. 5, an additional beam divider mirror 720 and a light absorber 730 is necessary. The additional beam divider mirror 720 is then arranged in one of the two ray paths 510 and 52c and enables the light emitted by the source 71 to be coupled into the system.

Another embodiment of the coupling-in device is illustrated in FIG. 7. In this embodiment, a beam divider optic utilizes an optical directional coupler 8 having four gates with input gates 811 and 814 and output gates 812 and 822. The input gate 811 is coupled to the light source and the output gate 812 and 822 are coupled to one of the cores 31 and 32, respectively, of the multicore fiber. The directional coupler is constructed of two light waveguides 81 and 82, which are so close to one another in the center section that light can cross couple therebetween. In utilizing a multicore fiber 1 in which the cores are likewise so close to one another, a directional coupler 8 of this type does not provide any advantages. A directional coupler of this type is preferably employed with multicore fibers in which the cores 31 and 32 are spaced far apart. The interval of the light waveguides 81 and 82 can be matched to the interval of the cores so that the aligned coupling between the two light waveguides is possible.

The directional coupler 8 can however also be employed as a beam divider device of a receiving installation and can for example replace the beam divider device 43 and 44 in FIG. 5. The output coupling of the light which is passed through the cores 31 and 32 and the light waveguides 81 and 82 can proceed via the input gate 811 which is simultaneously an output gate and the fourth gate 814. The light coupled out of the gates 811 and 814 correspond to the light conducted in the beam paths 510 and 50c of FIG. 5.

Directional couplers can for example be manufactured in the form of a stripped shape waveguide utilizing an integrated technology. However, double core fibers have already been proposed as directional couplers. Basically all such directional couplers are suitable.

An additional device for coupling light into the cores of the multicore fibers is preferably employed with the case of the multicore fiber 1" which has closely disposed cores 31 and 32. This device concentrates the light wave paths coming from the light source for the purpose of input coupling to the end face of the multicore fiber 1" in such a manner that various cores are illuminated. As illustrated in FIG. 6, the device is readily combinable with a light measuring means for the device in which coupling-in and coupling-out is conducted via the same end face of the multicore fibers. As in the case of the input coupling device according to FIG. 5, this applies to the receiving installation according to FIG. 5 as well as according to the receiving installation according to FIG. 6. In every instance, merely a beam divider mirror 76 is arranged in the beam paths of the output coupled light so that light from a source 74 can be reflected into the lens 50 for being focused onto the cores. The light of a light source 74 which passes through the beam divider mirror 76 is expediently again collected by a light absorber 77.

The above described device for coupling light into the optical fiber and for measuring the light emitted from the cores of the optical fiber can be employed separately or in various other combinations than those that are specifically illustrated.

If light which has been coupled out of one core and the light which is coupled out of the other core are conducted at least areally in beam paths which are separated from one another, it is expedient to arrange in one of the separate beam paths or tracks a controllable optical phase modulator. With this phase modulator, a phase shift or displacement can be additionally impressed on the light which passes therethrough. A relative phase shift between the separate ray paths can thereby, for example, be compensated and utilized in a measurement techinal fashion and in the case of impressment of fluctuating phase shift, information can be additionally obtained regarding the direction of the bending of the multicore fiber. An arrangement of a phase modulator 9 in a ray path 502 of the device of FIG. 5. is illustrated in FIG. 8. A phase modulator 9, for example, can be employed which is based on the electro-optical effect (Pockels effect). In an embodiment of the phase modulator of this type, a KDP-crystal has electrodes 91 and 92. A voltage U is connected to the electrodes 91 and 92 to create an electrical field E, which will influence the phase of the light passing through the crystal.

Although various minor modifications may be suggested by those versed in the art, it should be understood that I wish to embody within the scope of the patent granted hereon, all such modifications as reasonably and properly come within the scope of my contribution to the art.

I claim:

1. In a sensing device having a sensing element including an optical fiber, means for coupling light into the fiber and means for measuring alterations in specific physical parameters of the light passing through the fiber to determine special physical influences applied to the fiber, the improvements comprising the fiber being a multicore fiber having at least two adjacently extending cores surrounded by a common cladding and one end with an end face provided with a mirror so that light traveling in the cores is reflected at said one end to traverse the cores in the opposite direction; and said means for measuring the alterations in the parameters measuring the changes in the light passing through each of the cores in response to deformation of the fiber.

2. In a sensing device having a sensing element including an optical fiber, means for coupling light into the fiber and means for measuring alterations in specific physical parameters of the light passing through the fiber to determine special physical influences applied to the fiber, the improvements comprising the fiber being a multicore fiber having at least two adjacently extending cores surrounded by a common cladding, said multicore fiber being twisted about its longitudinal axis so that the device is permanently sensitive to deformation in any direction; and said means for measuring the alterations in the parameters measuring the changes in the light passing through each of the cores in response to deformation of the fiber.

3. In a sensing device having a sensing element including an optical fiber, means for coupling light into the fiber and means for measuring alterations in specific physical parameters of the light passing through the fiber to determine special physical influences applied to the fiber, the improvements comprising the fiber being a multicore fiber having at least two adjacently extending cores surrounded by a common cladding, said adjacently extending cores being spaced apart a sufficient distance in the fiber so that no appreciable cross-coupling occurs therebetween; and said means for measuring the alterations in the parameters measuring the changes in the light passing through each of the cores in response to deformation of the fiber, said means for measuring including means for superimposing the beams of light emitted from each of the cores into at least one superimposed beam and a light-receiving surface disposed in said superimposed beam.

4. In a sensing device according to claim 3, wherein the light receiving surfaces comprises a collecting screen on which an interference pattern of each superimposed beam is directly observed.

5. In a sensing device according to claim 3, wherein the light receiving surface comprises a light sensitive surface of a light sensitive detector which monitors light intensity of an interference pattern of the superimposed beam.

6. In a sensing device according to claim 3, wherein the means for superimposing the separate beams for each of the cores includes at least one beam divider device interposed in each beam emitted from the cores of the multicore waveguide.

7. A sensing device according to claim 6, wherein a collecting optic is disposed in the path of the beams emitted from the end of the waveguide and in each of the superimposed beams.

8. In a device according to claim 6, which includes a polarizer arranged in the path of the beams emitted from each of the cores.

9. In a sensing device according to claim 3, wherein a collecting optic is disposed in the path of the beams emitted from the cores of the fiber and in the path of each superimposed beam.

10. In a sensing device according to claim 3, wherein a polarizer is arranged in the path of the beams emitted from the cores.

11. In a sensing device according to claim 3, wherein the means for coupling light into the fiber includes a light source, a beam divider optic for splitting the light from the source into a beam for each core, and means for focusing each of the split beams into the ends of the cores for coupling thereto.

12. In a sensing device according to claim 11, wherein one end of the multicore fiber is provided with a mirror so that light is coupled into the opposite end and coupled out of the opposite end, said beam divider optics including a beam divider mirror arranged in the path of the light emitted by the light source and arranged obliquely to an axis of a beam emitted by one core of the fiber, said mirror passing a first partial beam extending along the first axis toward the one core and creating a second partial beam extending at right angles to the first axis, a second mirror disposed in the path of a beam from the other core and obliquely to the axis of the second partial beam and reflecting light into a path extending to the other core, collecting lens means disposed in the two paths of light being directed towards the cores for concentrating and focusing the light into the cores.

13. In a sensing device according to claim 12, which includes another beam divider mirror interposed between the source and the first mentioned beam divider mirror for directing the beam from the source at the first beam divider mirror, and wherein the first beam divider mirror and second mirror are the means for superimposing beams emitted from the cores and from two superimposed beams directed at the measuring means.

14. In a sensing device according to claim 11, wherein the beam divider device comprises an optical directional coupler having a pair of input gates and a pair of output gates, one of said input gates being coupled to the light source and each of the output gates being coupled to a separate core of the multicore fiber.

15. In a sensing device having a sensing element including an optical fiber, means for coupling light into the fiber and means for measuring alterations in specific physical parameters of the light passing through the fiber to determine special physical influences applied to the fiber, the improvement comprising the fiber being a multicore fiber having two cores with a small diameter running adjacent to each other and surrounded by a common cladding so that an appreciable amount of cross-coupling occurs therein; said means for measuring the alterations in the parameters measuring the changes in the light passing through each of the cores in response to deformation of the fiber, said means for measuring including means for directing each of the beams coupled from the two cores separately at separate light-receiving surfaces with each of the light-receiving surfaces being a light-sensitive surface of a light-sensitive detector; one end of the fiber being provided with a mirror so that all light is coupled into and out of the fiber at the opposite end; and said means for coupling including a light source, a beam divider mirror disposed in the path of the beam from said light source and the paths of the two beams emitted from the cores, and lens means for focusing the light reflected by the beam divider mirror into the ends of each of the cores.

16. In a sensing device having a sensing element including an optical fiber, means for coupling light into the fiber and means for measuring alterations in specific physical parameters of the light passing through the fiber to determine special physical influences applied to the fiber, the improvements comprising the fiber being a multicore fiber having at least two adjacently extending cores surrounded by a common cladding and said means for measuring the alterations in the parameters measuring the changes in the light passing through each of the cores in response to deformation of the fiber, said means for measuring including means for conducting the light emitted from each of the cores along a separate path for at least a part of the distance, said means for conducting including a controllable optical phase modulator arranged in one of said separate paths to enable modulating the light in said one path.

17. In a sensing device having a sensing element including an optical fiber, means for coupling light into the fiber and means for measuring alterations in specific physical parameters of the light passing through the fiber to determine special physical influences applied to the fiber, the improvements comprising the fiber being a multicore fiber having a pair of adjacently extending cores surrounded by a common cladding, each of the cores of the pair being spaced apart in the fiber a sufficient amount so that no appreciable cross-coupling occurs therebetween; and said means for measuring the alterations in the parameters measuring the changes in the light passing through each of the cores in response to deformation of the fiber, said means for measuring including an optical directional coupler having a pair of input gates and a pair of output gates, said input gates receiving light emitted from the pair of cores and said output gates emitting two beams of superimposed light, said means for measuring including a light-receiving surface arranged in each of the superimposed beams to observe the amount of interference therein.

* * * * *